US012473195B2

(12) United States Patent
Gerhardt

(10) Patent No.: US 12,473,195 B2
(45) Date of Patent: Nov. 18, 2025

(54) EQUINE HALTER ATTACHMENT

(71) Applicant: THINLINE, LLC, Durham, NC (US)

(72) Inventor: Evan Gerhardt, Alden, NY (US)

(73) Assignee: ThinLine, LLC, Durham, NC (US)

( * ) Notice: Subject to any disclaimer, the term of this patent is extended or adjusted under 35 U.S.C. 154(b) by 0 days.

(21) Appl. No.: 19/036,510

(22) Filed: Jan. 24, 2025

(65) Prior Publication Data

US 2025/0243050 A1 Jul. 31, 2025

Related U.S. Application Data

(60) Provisional application No. 63/625,946, filed on Jan. 27, 2024.

(51) Int. Cl.
*B68B 1/02* (2006.01)
*B68B 1/04* (2006.01)

(52) U.S. Cl.
CPC .......... *B68B 1/02* (2013.01); *B68B 2001/042* (2013.01)

(58) Field of Classification Search
CPC ............................ B68B 1/02; B68B 2001/042
See application file for complete search history.

(56) References Cited

U.S. PATENT DOCUMENTS 109,431 A 11/1870 Plongeon
968,279 A * 8/1910 Steele et al. .............. B68B 1/02 54/24
2,469,046 A * 5/1949 Laws ........................ B68B 1/06 54/6.1
2,525,684 A * 10/1950 Kinskie ..................... B68B 1/02 54/24
4,337,610 A * 7/1982 Taylor ....................... B68B 1/02 54/15
4,722,171 A * 2/1988 Meroth ..................... B68B 1/04 54/6.1
6,691,497 B1 * 2/2004 Rodgers .................... B68B 1/04 54/6.1
7,377,090 B2 * 5/2008 Dyck ........................ B68B 7/00 54/80.1
9,216,896 B1 * 12/2015 Hegland ................... B68B 1/02
2004/0168413 A1 * 9/2004 Rodgers .................... B68B 1/02 54/6.1

(Continued)

FOREIGN PATENT DOCUMENTS

DE 202006002710 U1 7/2006
DE 202008015427 U1 7/2009

(Continued)

OTHER PUBLICATIONS

International Search Report & Written Opinion in PCT/US2025/012877, mailed Mar. 5, 2025.

*Primary Examiner* — Jessica B Wong
(74) *Attorney, Agent, or Firm* — Barnes & Thornburg LLP

(57) ABSTRACT

An equine harness includes a nose-piece harness strap configured to at least partially surround a nose of a horse, and a nose-piece attachment coupled to an inner surface of the nose-piece harness strap to engage with the nose of the horse. The nose-piece attachment includes a first side segment at a first end of the nose-piece attachment, a second side segment at an opposite, second end of the nose-piece attachment, and a center segment coupled between the first side segment and the second side segment.

20 Claims, 4 Drawing Sheets

(56) References Cited

U.S. PATENT DOCUMENTS

| | | | | |
|---|---|---|---|---|
| 2011/0252751 | A1* | 10/2011 | Nin | B68B 1/02 54/24 |
| 2015/0259189 | A1* | 9/2015 | Gipson | B68B 1/02 54/24 |
| 2018/0139930 | A1* | 5/2018 | Walshe | A01K 27/001 |
| 2021/0053813 | A1* | 2/2021 | Miller | B68B 1/02 |

FOREIGN PATENT DOCUMENTS

| | | | |
|---|---|---|---|
| NL | 2021532 | B1 | 4/2020 |
| WO | 2022078801 | A1 | 4/2022 |

* cited by examiner

EQUINE HALTER ATTACHMENT

PRIORITY CLAIM

This application claims priority under 35 U.S.C. § 119(e) to U.S. Provisional Patent Application No. 63/625,946, filed Jan. 27, 2024, which is expressly incorporated by reference herein in its entirety.

FIELD OF THE DISCLOSURE

The present disclosure relates generally to the field of equine accessories, and more specifically to a device designed to attach to a horse's halter. This device aims to enhance the functionality and convenience of horse halters by providing additional features and capabilities.

BACKGROUND

Halters and other harnesses are fundamental tools in the management and handling of horses, serving as essential equipment for leading, tying, and restraining the animal. While traditional halters are effective in their basic functionality there is a need for improvements and innovations to address various challenges faced by horse owners, trainers and handlers.

A chain shank may be attached to a lead rope for use with a halter. When pressure is applied to the lead rope, the shank puts pressure on the sensitive nasal bones of the horse, greatly amplifying the handler's signals. It quickly gets the attention of horses that have been handled incorrectly or do not respond to more subtle pressure.

SUMMARY

In accordance with the present disclosure an equine harness includes a nose-piece harness strap configured to at least partially surround a nose of a horse and a nose-piece attachment coupled to an inner surface of the nose-piece harness strap to engage with the nose of the horse. The nose-piece attachment including a first side segment at a first end of the nose-piece attachment, a second side segment at an opposite, second end of the nose-piece attachment, and a center segment coupled between the first side segment and the second side segment.

In illustrative embodiments, the first side segment, the second side segment, and the center segment have an inner surface and an outer surface arranged to face away from the horse's nose. The nose-piece attachment is shaped to bridge the nasal cavities of the hose by providing spacing between the inner surface and the nose of the horse as the nose-piece attachment extends around the horse's nose.

Additional features of the present disclosure will become apparent to those skilled in the art upon consideration of illustrative embodiments exemplifying the best mode of carrying out the disclosure as presently perceived.

DETAILED DESCRIPTION

Figure 1:
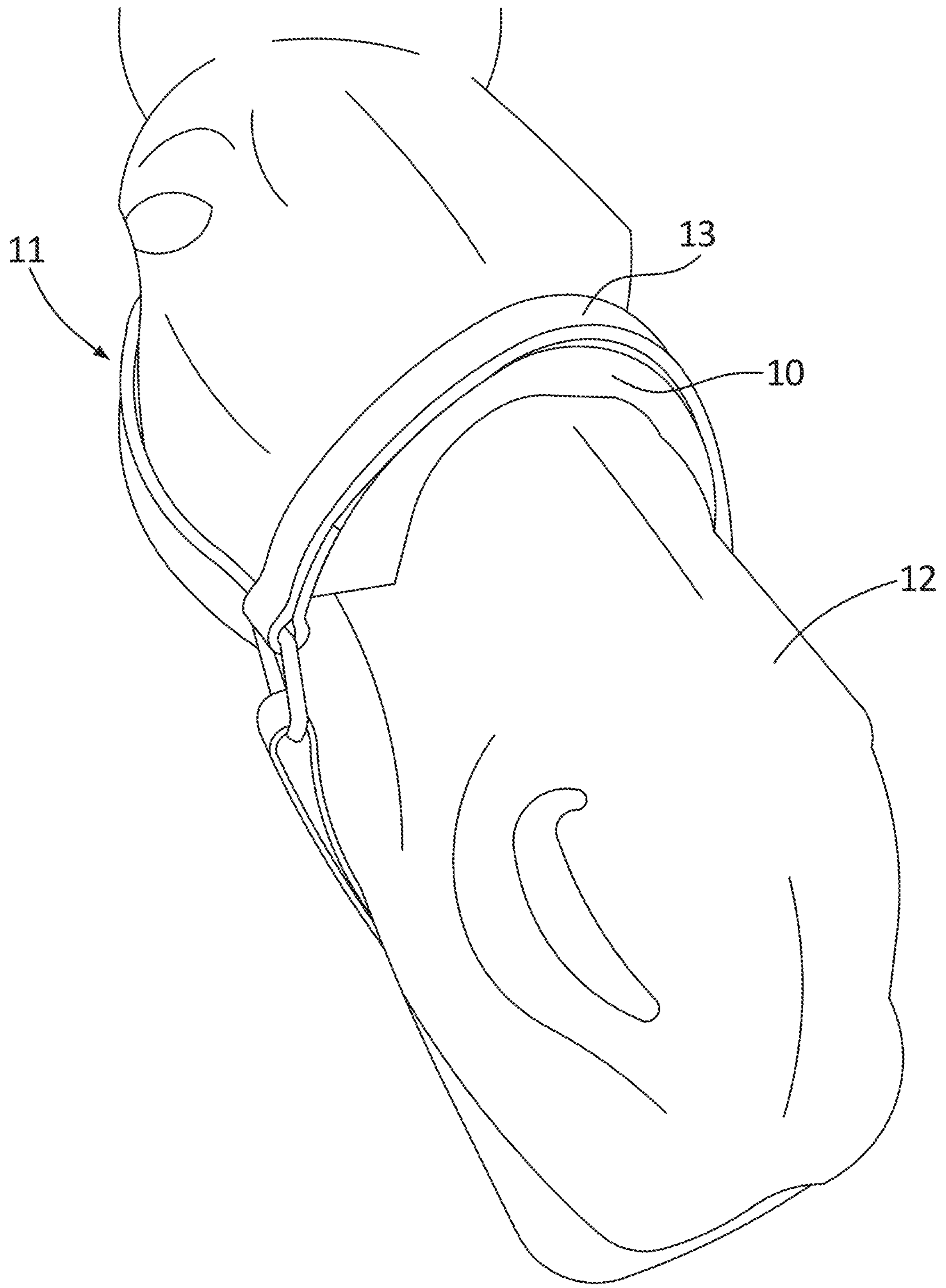
FIG. 1 is a perspective view of a horse wearing the halter attachment of the present disclosure.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this disclosure. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, the present disclosure meets the above described need by providing an equine halter attachment, or a nose-piece attachment 10. As shown the equine halter attachment 10 is positioned on the inside of a nose-piece harness strap 13, or nose piece, included in an equine halter 11. The nose piece 13 forms the upper portion of the noseband on the halter 11. The attachment 10 can also be attached to a bosal or nose piece included in a bridle or a cavesson. The attachment 10 can also be attached to a tie down accessory with or without a bridle. The attachment 10 may be attached removably or permanently to other tack accessories.

Figure 3:
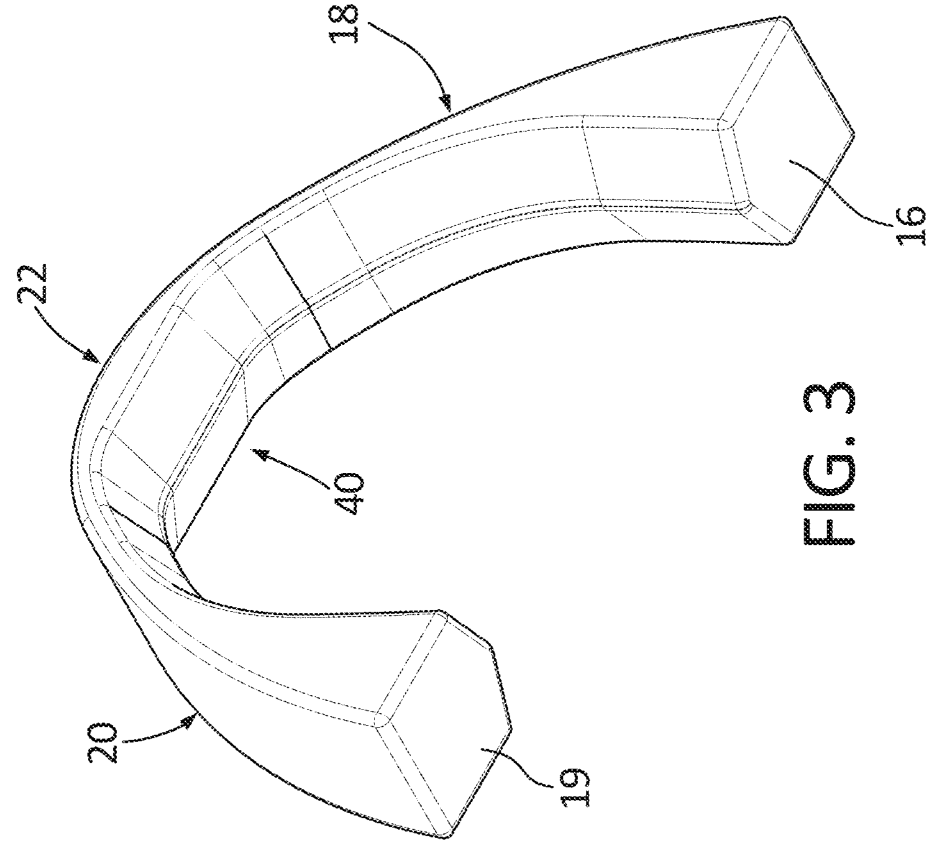
FIG. 3 is another perspective view of the halter attachment shown in FIG. 2.
Figure 2:
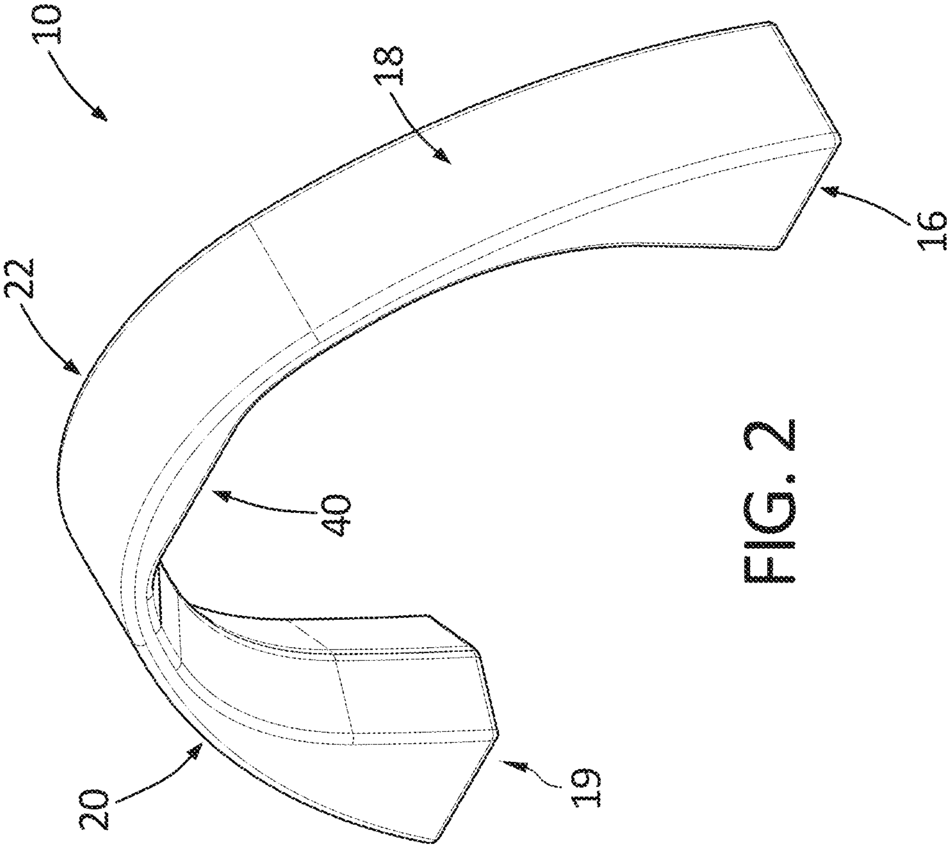
FIG. 2 is a perspective view of the halter attachment of the present disclosure.

Turning to FIGS. 2-3, the equine halter attachment 10 may be generally shaped in the form of an arc or curve from a first end 16 to a second end 19 such that the device 10 extends over the bridge and to the sides of the nose of a horse. The equine halter attachment 10 includes a first side segment or portion 18, a second side segment or portion 20, and a center segment or portion 22. The first side segment 18 extends from the first end 16 to the center segment 22. The second side segment 20 extends from the second end 19 to the center segment 22.

The equine halter attachment 10 has a varying thickness between an outer surface 30 and an inner surface 31 as the equine halter attachment 10 extends from the first end 16 to the second end 19. For example, the center portion 22 of the device 10 may have a thickness 60 less than a thickness 62 at the ends 16,19 such that the ends are flared outward at a bottom end of the nose-piece attachment 10. The equine halter attachment 10 may further have a thickness 64, less than thicknesses 60, 62 at a location between the center segment 22 and the ends 16, 19. The center portion 22 of the device 10 may be provided with a flat section 40 on the inside surface 31.

Figure 4:
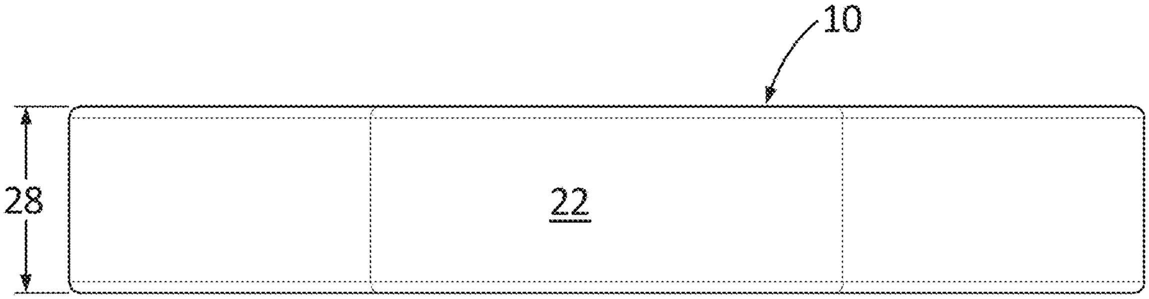
FIG. 4 is a top plan view of the halter attachment shown in FIG. 2.
Figure 5:
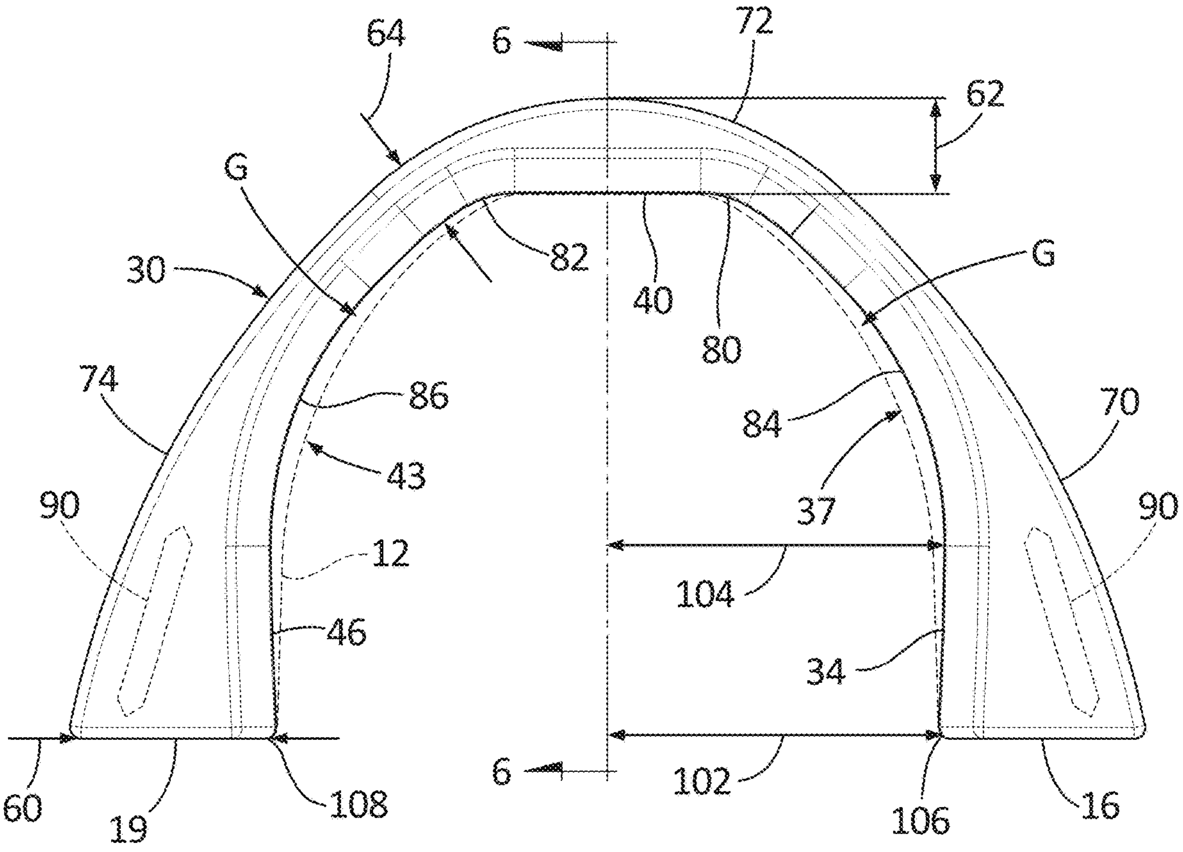
FIG. 5 is a front elevation view of the halter attachment shown in FIG. 2.

Turning to FIG. 4, the device 10 may be provided with a uniform or constant width 28 from one end 16 to the other end 19. As shown in FIG. 5, the outer surface of the device 10 may be provided with an arc from the first end 16 of the device 10 to the second end 19. The inner surface 31 of the device 10 may be provided with a shape that creates a varying thickness of the device 10 from the first end 16 to the second end 19.

The outer surface 30 includes a first curved segment 70 coupled to the first end 16, a second curved segment 72 coupled to an end of the first curved segment 70 and providing at least a portion of the center segment 22, and a third curved segment 74 coupled to the second end 19 and an end of the second curved segment 72. The first and third curved segments 70, 74 include a first radius of curvature and the second curved segment 72 includes a second radius of curvature less than the first radius of curvature.

The inner surface 31 a first curved portion 37, a flat portion 40 coupled to an end of the first curved portion 37, and a second curved portion 43 coupled to an end of the flat portion 40 and spaced apart from the first curved portion 37. The first curved portion 37 extends from the first end 16 to the flat portion 40. The flat portion 40 interconnects the first curved portion 37 and the second curved portion 43. The second curved portion extends from the second end 19 to the flat portion 40.

The first curved portion 37 and the second curved portion 43 may have a plurality of curvatures with varying degrees. The first and second curved portions 37, 43 each include a first curved segment 34, 46 having a first radius of curvature and a second curved segment 80, 82 having a second radius of curvature less than the first radius of curvature. The first curved segments 34, 46 are coupled to the first end 16 and the second end 19, respectively, and the second curved segments 80, 82 are coupled to respective ends of the flat portion 40. The first and second curved segments 37, 43 each further include a third curved segment 84, 86 having a third radius of curvature less than the first radius of curvature and greater than the second radius of curvature. The inner surface 31 can include additional curved sections in some embodiments.

The inner surface 31 is spaced apart from a centerline of the nose-piece attachment 10 a first distance 102 at the first end 16 and the second end 19. The inner surface 31 is spaced apart from the centerline a second distance 104 greater than the first distance 102 at a location spaced apart from the first end 16 and the second end 19. Specifically, a first end of the first curved segments 34, 46, located at the first end 16 of the nose-piece attachment, is spaced apart from the centerline of the nose-piece attachment 10 by the first distance 102 and a second end of the first curved segments 34, 46, opposite the first end of the first curved segment 34, is spaced apart from the centerline by the second distance 104. Portions of the third curved segments 84, 86 may also be spaced apart from the centerline by a distance greater than the first distance 102 and the second distance 104. This arrangement provide means for establishing a primary pressure point 106, 108 at the first end 16 and the second end 19 when the nose-piece attachment 10 is installed on the nose 12 of the horse to cause pressure exerted by the nose-piece attachment 10 at the second location 104 to be minimized so that nasal cavities of the hose are unimpeded by pressure exerted by the nose-piece harness 13. An additional pressure point may be established by the flat portion 40 to locate a first gap G between the first pressure point 106 and the flat portion 40 and a second gap G between the second pressure point 108 and the flat portion 40. In other words, the shape of the inner surface 31 provides for gaps G to be formed between the nose 12 of the horse and the inner surface 31 so that the inner surface 31 is partially spaced from the nose 12 where the horses nasal cavities are located. In this way, the equine harness attachment 10 bridges the nasal cavities of the horse's nose to define the gaps G between the inner surface 31 and the horse's nose 12.

In some embodiments, starting at the first end 16, the inner surface may have a first substantially straight lower portion 34 that extends upward. At the end of the substantially straight portion 34, a first curved portion 37 extends upward until it joins with a flat upper portion 40. The flat upper portion 40 extends across the center portion 22 of the device 10 from the end of the first curved portion 37 to the beginning of a second curved portion 43 on the opposite side of the device 10. The second curved portion 43 extends downward until it coincides with a second substantially straight lower portion 46 that extends from the end of the second curved portion 43 to the second end 19. The complex inner shape provides for a flared larger thickness at the bottom of the device and a thinner portion at the top in the central portion 22 of the device 10.

The shape of the inner surface of the device 10 provides an optimal shape for mounting the device 10 on the nose of the horse in connection with the sensitive nasal bones of the horse. The device 10 may come in more than one size in order to accommodate different size horses and different size halters which may be constructed of leather or nylon.

Figure 6:
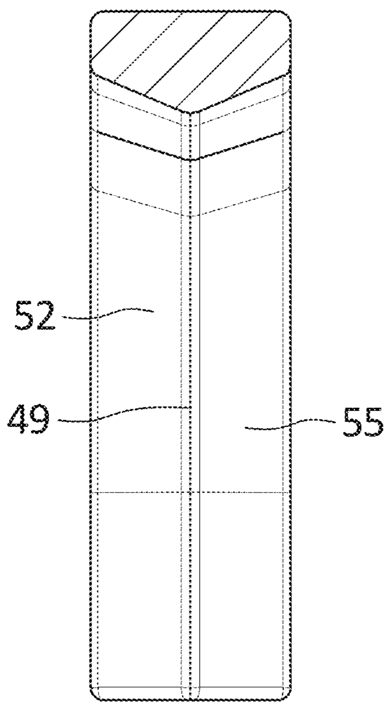
FIG. 6 is a section view taken along lines 6-6 in FIG. 5.
Figure 7:
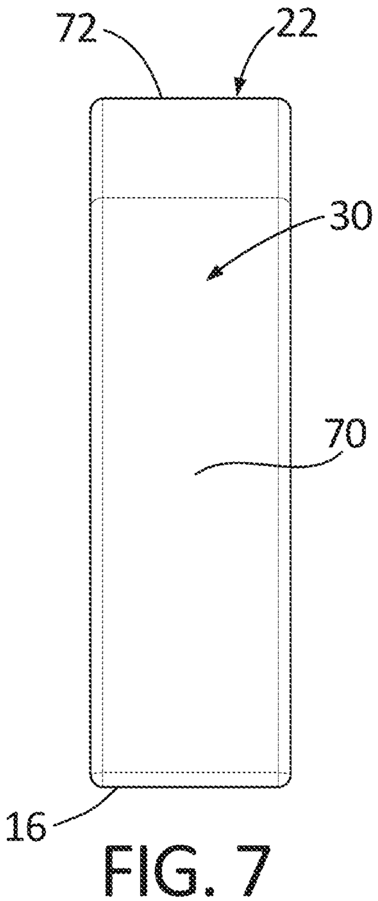
FIG. 7 is a left side elevation view of the halter attachment shown in FIG. 2, the right side being the mirror image thereof; and, FIG. 8 is a bottom plan view of the halter attachment shown in FIG. 2.
Figure 8:
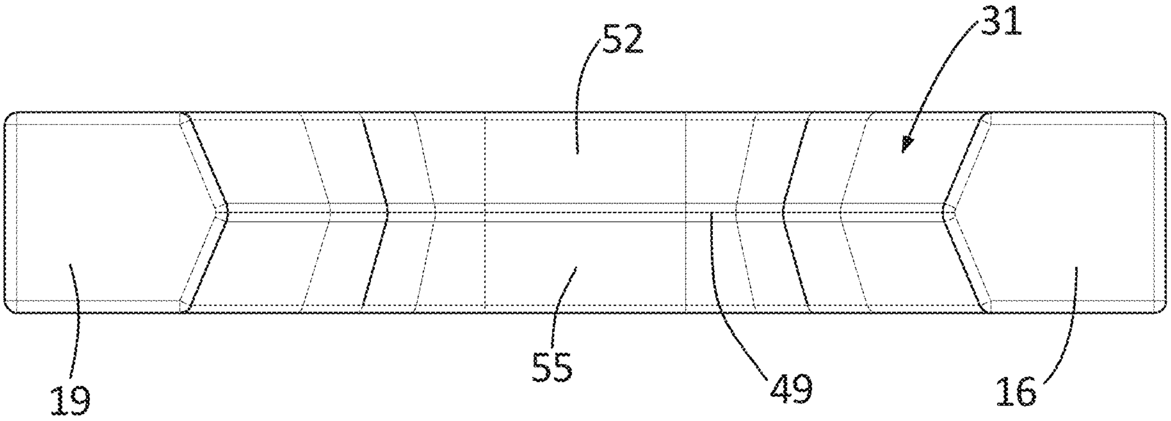

Turning to FIG. 6, the cross-sectional view of the device 10 shows that the center of the device may be formed in the shape of a chevron in cross section such that a point or apex 49 which may be slightly rounded is disposed at the bottom of the inner surface 31 to engage with the surface of the nose of the horse to provide pressure and control to the horse. As shown in FIG. 8, the inner surface 31 may be provided with angled inner surfaces 52, 55. The inner surfaces 52, 55 may extend only partway along or throughout the entire length of the inner surface 31 to provide a rounded point or apex 49 that may contact the nose of the horse along the entire length of the device 10. The rounded point 49 is configured to focus pressure onto the nose of the horse so that a handler's signals to the horse using the equine harness 11 are amplified to increase control of the horse.

One purpose or benefit of the equine halter attachment 10 is to provide extra control when using a lead rope with a halter. The equine halter attachment 10 may be constructed of a rigid thermoplastic material. Other rigid materials suitable for mounting on the nose of the horse and applying pressure without causing injury are also suitable including a rubber material or another flexible material. The equine halter attachment 10 replaces a chain shank for applying pressure to the sensitive nasal bones of the horse, greatly amplifying the handler's signals. The equine halter attachment 10 may be permanently affixed to the nose piece 13 by one or more fasteners, adhesives, or the like. Alternatively, the equine halter attachment 10 may be removable and attached by one or more fasteners or the like. For example, the attachment 10 may be formed to include one or more slots 90 configured to receive a fastener such as a band that is wrapped around the nose piece 13. The slots 90 are formed in the thicker region of the attachment 10 near the pressure points 106, 108. A halter with the equine halter attachment 10 attached thereto is much easier to put on the horse than a chain shank. Chain shanks may bind into the hand of the person trying to install it and the techniques and success of mounting the chain shank onto the halter and nose piece vary greatly which may result in discomfort to the horse or the person placing the chain shank on the horse.

The present disclosure contemplates that many changes and modifications may be made. Therefore, while the presently-preferred form of the equine halter attachment 10 has been shown and described, and several modifications and alternatives discussed, persons skilled in this art will readily appreciate that various additional changes and modifications may be made without departing from the spirit of the disclosure, as defined and differentiated by the following claims.

The invention claimed is:

1. An equine harness comprising:

a nose-piece harness strap configured to at least partially surround a nose of a horse, and a nose-piece attachment coupled to an inner surface of the nose-piece harness strap to engage with the nose of the horse, the nose-piece attachment including a first side segment at a first end of the nose-piece attachment, a second side segment at an opposite, second end of the nose-piece attachment, and a center segment coupled between the first side segment and the second side segment, wherein the first side segment, the second side segment, and the center segment have an outer surface arranged to face away from the nose of the horse and an inner surface arranged to face toward the nose of the horse and spaced apart from a centerline of the nose-piece attachment by a first distance at the first end and the second end and a second distance, greater than the first distance, at a location spaced apart from the first end and the second end such that the nose-piece attachment is configured to establish a gap between the inner surface and the nose of the horse on each side of the centerline.

2. The equine harness of claim 1, wherein the outer surface is formed in the shape of an arc, and the first side segment and the second side segment have a first thickness and the center segment has a second thickness less than the first thickness.

3. The equine harness of claim 2, wherein the second thickness is located in a center of the center segment and the nose-piece attachment further includes a third thickness, less than the second thickness, on each side of the center segment.

4. The equine harness of claim 3, wherein the inner surface of the nose-piece attachment is configured to apply a load on the nose of the horse at one or more locations corresponding to the first thickness, and a gap is formed between the nose of the horse and the inner surface of the nose-piece attachment at locations corresponding to the third thickness.

5. The equine harness of claim 3, wherein the second thickness is in a flat portion of the inner surface and the third thickness is in a curved portion of the inner surface.

6. The equine harness of claim 1, wherein the nose-piece attachment has a constant width.

7. The equine harness of claim 1, wherein the inner surface has a first angled surface and a second angled surface joined at an apex between the first angled surface and the second angled surface.

8. The equine harness of claim 7, wherein the apex is rounded.

9. The equine harness of claim 7, wherein the apex extends along an entire length of the inner surface.

10. The equine harness of claim 7, wherein the first angled surface and the second angled surface each have a constant width.

11. The equine harness of claim 1, wherein the inner surface includes a first curved portion, a flat portion coupled to an end of the first curved portion, and a second curved portion coupled to and end of the flat portion and spaced apart from the first curved portion.

12. The equine harness of claim 11, wherein first curved portion and the second curved portion each have a plurality of curvatures with varying degrees.

13. The equine harness of claim 11, wherein the first and second curved portions each include a first curved segment having a first radius of curvature and a second curved segment having a second radius of curvature less than the first radius of curvature.

14. The equine harness of claim 13, wherein the first curved segments are coupled to the first end and the second end, respectively, and the second curved segments are coupled to respective ends of the flat portion.

15. The equine harness of claim 13, wherein the first and second curved segments each further include a third curved segment having a third radius of curvature less than the first radius of curvature and greater than the second radius of curvature.

16. The equine harness of claim 13, wherein a first end of the first curved segment is located at the first end of the nose-piece attachment and is spaced apart from a centerline of the nose-piece attachment by a first distance and a second end of the first curved segment, opposite the first end of the first curved segment, is spaced apart from the centerline by a second distance greater than the first distance.

17. The equine harness of claim 1, wherein the outer surface includes a first curved segment coupled to the first end, a second curved segment coupled to an end of the first curved segment and providing at least a portion of the center segment, and a third curved segment coupled to the second end and an end of the second curved segment.

18. The equine harness of claim 17, wherein the first and third curved segments include a first radius of curvature and the second curved segment includes a second radius of curvature less than the first radius of curvature.

19. The equine harness of claim 1, wherein the inner surface includes a flat portion located at an upper end of the nose-piece attachment and the first end and the second end extend along a plane that is parallel with the flat portion.

20. The equine harness of claim 1, wherein the nose-piece attachment provides means for establishing a primary pressure point at the first end and the second end when the nose-piece attachment is installed on the nose of the horse to cause pressure exerted by the nose-piece attachment at the second location to be minimized so that nasal cavities of the hose are unimpeded by pressure exerted by the nose-piece harness.

* * * * *